(12) United States Patent
Leupold et al.

(10) Patent No.: US 7,861,545 B2
(45) Date of Patent: Jan. 4, 2011

(54) AIR CONDITIONING CUT-OUT CIRCUIT

(75) Inventors: Alan G. Leupold, Plainfield, IL (US); Eric J. Zieser, Burlington, IA (US); Joseph E. Borg, Burlington, IA (US); Jared A. Heckart, Danville, IA (US)

(73) Assignee: CNH America LLC, New Holland, PA (US)

( * ) Notice: Subject to any disclaimer, the term of this patent is extended or adjusted under 35 U.S.C. 154(b) by 579 days.

(21) Appl. No.: 11/818,016

(22) Filed: Jun. 13, 2007

(65) Prior Publication Data
US 2008/0000244 A1   Jan. 3, 2008

Related U.S. Application Data

(60) Provisional application No. 60/813,741, filed on Jun. 14, 2006.

(51) Int. Cl.
*F25D 29/00* (2006.01)

(52) U.S. Cl. ............... 62/161; 62/228.3; 417/223; 417/316

(58) Field of Classification Search ............ 62/129, 62/161, 209, 226, 228.3, 228.1, 228.5; 417/45, 417/213, 223, 316, 319
See application file for complete search history.

(56) References Cited

U.S. PATENT DOCUMENTS

| | | | | |
|---|---|---|---|---|
| 834,870 | A | | 10/1906 | Chester |
| 3,898,527 | A | | 8/1975 | Cawley .................. 317/13 R |
| 4,318,673 | A | * | 3/1982 | Kochanski et al. ............ 417/15 |
| 4,400,601 | A | | 8/1983 | Brucken ................... 200/81.4 |
| 4,463,571 | A | * | 8/1984 | Wiggs ........................ 62/126 |
| 4,463,573 | A | * | 8/1984 | Zeno et al. ................... 62/157 |
| 4,757,693 | A | | 7/1988 | Charriau et al. ............. 62/126 |
| 4,794,763 | A | * | 1/1989 | Kikuchi .................... 62/228.1 |
| 4,966,013 | A | | 10/1990 | Wood ........................ 62/913 |
| 5,218,837 | A | * | 6/1993 | Moore ...................... 62/228.3 |
| 5,321,957 | A | * | 6/1994 | Moore ...................... 62/228.3 |
| 5,355,854 | A | * | 10/1994 | Aubee ....................... 123/431 |
| 5,457,965 | A | * | 10/1995 | Blair et al. ................... 62/129 |

(Continued)

FOREIGN PATENT DOCUMENTS

JP          4222371          8/1992

(Continued)

*Primary Examiner*—Cheryl J Tyler
*Assistant Examiner*—Paolo Gonzalez
(74) *Attorney, Agent, or Firm*—Patrick M. Sheldrake; Michael G. Harms

(57) ABSTRACT

A cut-out circuit for an air conditioner protects the air conditioning system components when subjected to low pressure conditions, without manually resetting the system after low pressure cut-out. The cut-out circuit preferably includes a relay, connectable to a voltage source through a normally closed low pressure switch to a compressor clutch, the relay operable in a closed state to output a voltage from the voltage source through the low pressure switch to the clutch, and in an open state to interrupt the voltage. The low pressure switch may open responsive to a low pressure condition interrupting voltage flow to the clutch. The circuit includes a normally open high pressure switch, connected to the relay and a voltage source, operable to close responsive to a high pressure condition, to output a voltage from a voltage source to the relay for changing the relay operating state to open.

3 Claims, 4 Drawing Sheets

U.S. PATENT DOCUMENTS

| | | |
|---|---|---|
| 5,761,918 A | 6/1998 | Jackson et al. ............... 62/181 |
| 5,951,260 A * | 9/1999 | Cramer et al. ............. 417/282 |
| 6,170,277 B1 | 1/2001 | Porter et al. ............. 62/228.3 |
| 6,381,971 B2 | 5/2002 | Honda ...................... 62/126 |

FOREIGN PATENT DOCUMENTS

| | | |
|---|---|---|
| JP | 6137726 | 5/1994 |

* cited by examiner

AIR CONDITIONING CUT-OUT CIRCUIT

This application claims the benefit of U.S. Provisional Application No. 60/813,741, filed Jun. 14, 2006.

TECHNICAL FIELD

This invention relates generally to an air-conditioning system, and, more particularly, a cut-out circuit for an air conditioner, which circuit is automatically operable for disengaging a clutch of the air conditioner responsive to an predetermined low pressure drop in a low pressure side of the air conditioner, and which is automatically operable for reengaging the compressor when the pressure drop is alleviated, while at the same time, a companion high pressure cut-out portion of the circuit is automatically operable for deactivating the compressor responsive to presence of a high pressure condition in a high pressure side, so as to require manually action to reactivate the compressor.

BACKGROUND ART

U.S. Provisional Application No. 60/813,741 filed Jun. 14, 2006 is incorporated herein in its entirety by reference.

A properly functioning air conditioner is vital for the cab on a tractor loader backhoe. Between the large area of window glass, and the high heat dissipation of the hydraulics and power train, a backhoe air conditioner is required to perform adequately on a regular basis.

The standard air conditioning system relies on five components to create the cool atmosphere: compressor, condenser, thermal expansion valve, evaporator, and receiver drier. Protection of these components from excessive overpressure on the high side, or vacuum on the lower side, is vital. This is normally accomplished by the use of high and low pressure switches. These switches are placed in locations to provide the necessary system safeguards. The high pressure switch on a tractor loader backhoe is generally located somewhere between the outlet of the compressor and the inlet of the receiver drier, and the low pressure switch is generally located at the outlet of the evaporator. The high pressure switch ensures that the compressor will not over pressurize the system, and cause premature failures of the compressor, condenser, and/or refrigerant lines. The low pressure switch ensures that the compressor will not operate with a vacuum inlet condition, which will cause premature failure of the compressor, as well as provide an opportunity to draw outside contamination into the system.

Monitoring and the controlling of the air conditioning system can be set up many ways. Most commonly, and the way that was initially in use on the tractor loader backhoe is shown in FIG. 3. This method energizes a normally closed relay with the output directly sent to the compressor. Voltage supplied to the relay, is dependent on the position of the air conditioning thermostat, and the blower switch. In addition, the voltage supplied to the relay is sent in parallel to both the high and low pressure switches. The high and low pressure switches of the system are set to be normally open during normal operating conditions. This maintains pressures less than 400 psi on the high side, and pressures greater than 4 psi on the low side.

When an abnormal operating condition occurs, (pressure drops above or below the switches' operating threshold) either switch will actuate and send a voltage to the electromagnet of the relay, causing the circuit to open. When this occurs, the armature of the relay is latched in the open position, and the compressor will remain off, until the system is manually cycled off and back on.

The cab of the loader backhoe sustains a quite high cab heat load, due to the large area of window glass, and the high heat dissipation of the hydraulics and power train. Therefore when there are outside ambient temperatures below 50° F., but the sun is shining bright, there will be cases where the air conditioning needs to be used. The thermodynamics of the air conditioning system is such that the cool ambient temperatures will create a greater pressure drop than usual, causing even more reliance on the low pressure switch. In addition to these cool weather conditions, constant internal cab temperature fluctuations caused by operators opening and closing windows/doors, and turning the heat or A/C on and off, will also create a low side pressure drop in the system that may actuate the low pressure switch.

With the previous system, this can lead to customer dissatisfaction. Every time there is a slight low side pressure drop, the air conditioning relay will latch out, causing the air conditioning system to shut down, and the operator is required to divert his or her attention, and physically turn the A/C system off and back on. These low pressure latch outs are brought to the operator's attention by a warning light on the side console. This is the same warning light that also warms the operator of a high side pressure rise.

Thus, what is sought is a low-pressure cut-out circuit for an air conditioner, which protects the air conditioning system components when subjected to the above low pressure conditions, yet which overcomes shortcomings of the know systems and provides advantages thereover, including avoiding the necessity for manually resetting the system after low pressure cut-out, and providing an ability to better diagnose problems with the system, so as to be more satisfactory when subjected to operating conditions such as described above.

SUMMARY OF THE DISCLOSURE

What is disclosed is a cut-out circuit for an air conditioner, which provides advantages of the known systems, including protecting the air conditioning system components when subjected to the above described low pressure conditions, yet which overcomes the disadvantages thereof, including, but not limited to, avoiding the necessity for manually resetting the system after low pressure cut-out, and providing an ability to better diagnose problems with the system.

According to a preferred aspect of the invention, the cut-out circuit includes a device, preferably a relay, connectable to a voltage source and through a normally closed first pressure switch to a compressor clutch, the relay being operable in a closed state to output a voltage from the voltage source through the first pressure switch to the clutch to engage it, and in an open state to cease outputting or interrupting the voltage to disengage it. The first pressure switch is operable to open responsive to a low pressure condition, to interrupt voltage flow to the clutch, to also disengage it. The circuit also includes a normally open second pressure switch connected to the relay and connectable to a voltage source, the second pressure switch being operable to close responsive to a high pressure condition, to output a voltage from a voltage source connected thereto, to the relay for changing the operating state of the relay to the open state, to thereby disengage the clutch. The first pressure switch is preferably a low pressure switch connected to a low pressure side of the air conditioning system. The second pressure switch is preferably a high pressure switch connected to a voltage source and to a high pressure side of the air conditioning system.

According to another preferred aspect of the invention, the relay is configured to latch in the open state when the voltage from the second pressure switch is outputted thereto. Also preferably, the relay is configured so as to unlatch when a predetermined condition is present, which condition is preferably removal and reapplication of a voltage thereto.

DETAILED DESCRIPTION OF THE INVENTION

Figure 1:
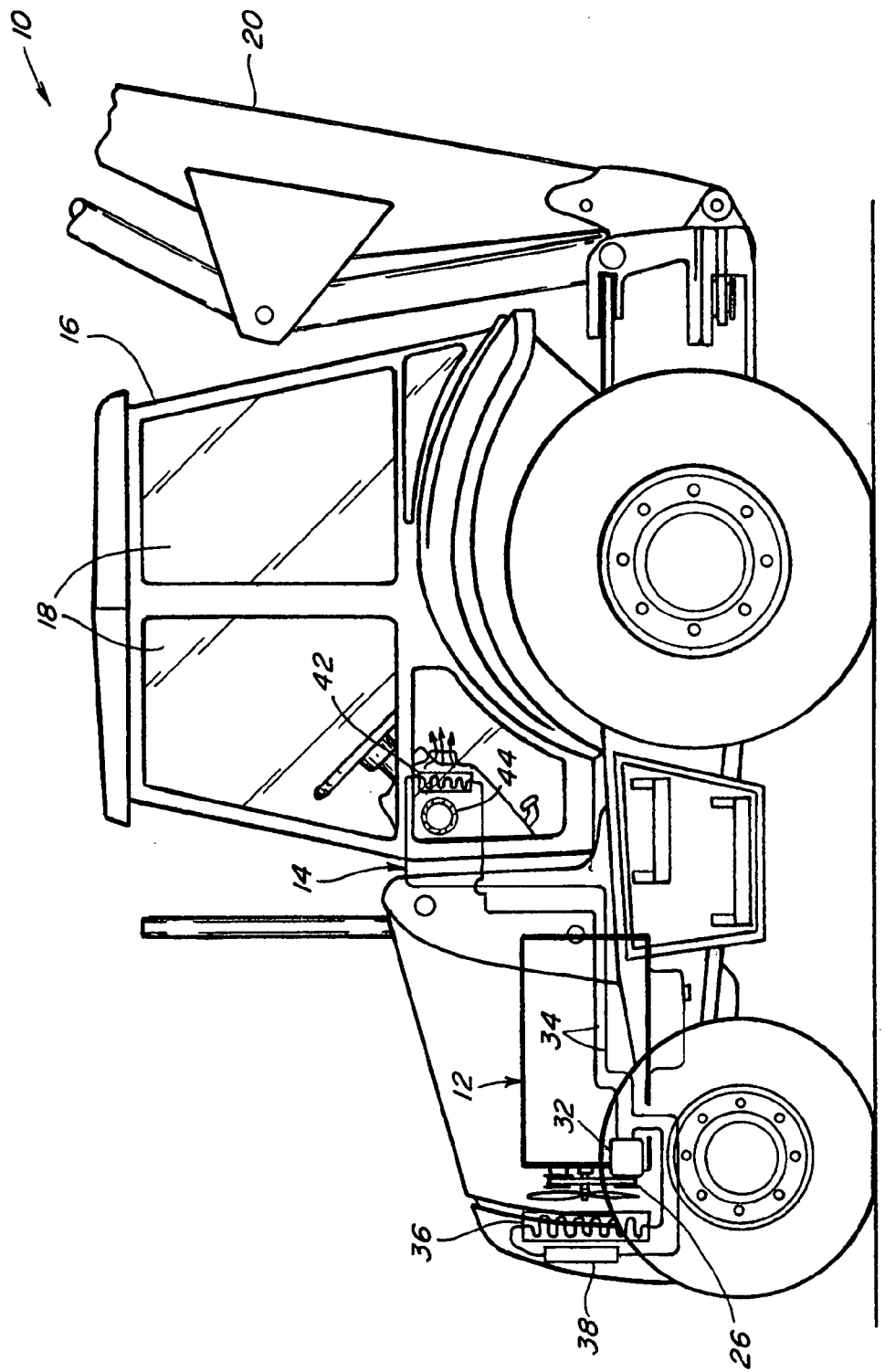
FIG. 1 is a side view of a tractor loader backhoe including an air conditioning system for an operator cab including a cut-out circuit according to the present invention.

Turning now to the drawings wherein aspects of a preferred embodiment of the invention is shown, in FIG. 1, a conventional work machine 10, which is a tractor loader backhoe, is shown. Tractor loader backhoe 10 is contemplated to be representative of a wide variety of work machines with which the present invention can be utilized. Tractor loader backhoe 10 includes an engine 12 operable for propelling it over surfaces such as the ground, and for powering a variety of systems thereof, including air conditioning system 14 for cooling an operator cab 16 surrounded by large windows 18, and apparatus including a backhoe 20.

Figure 2:
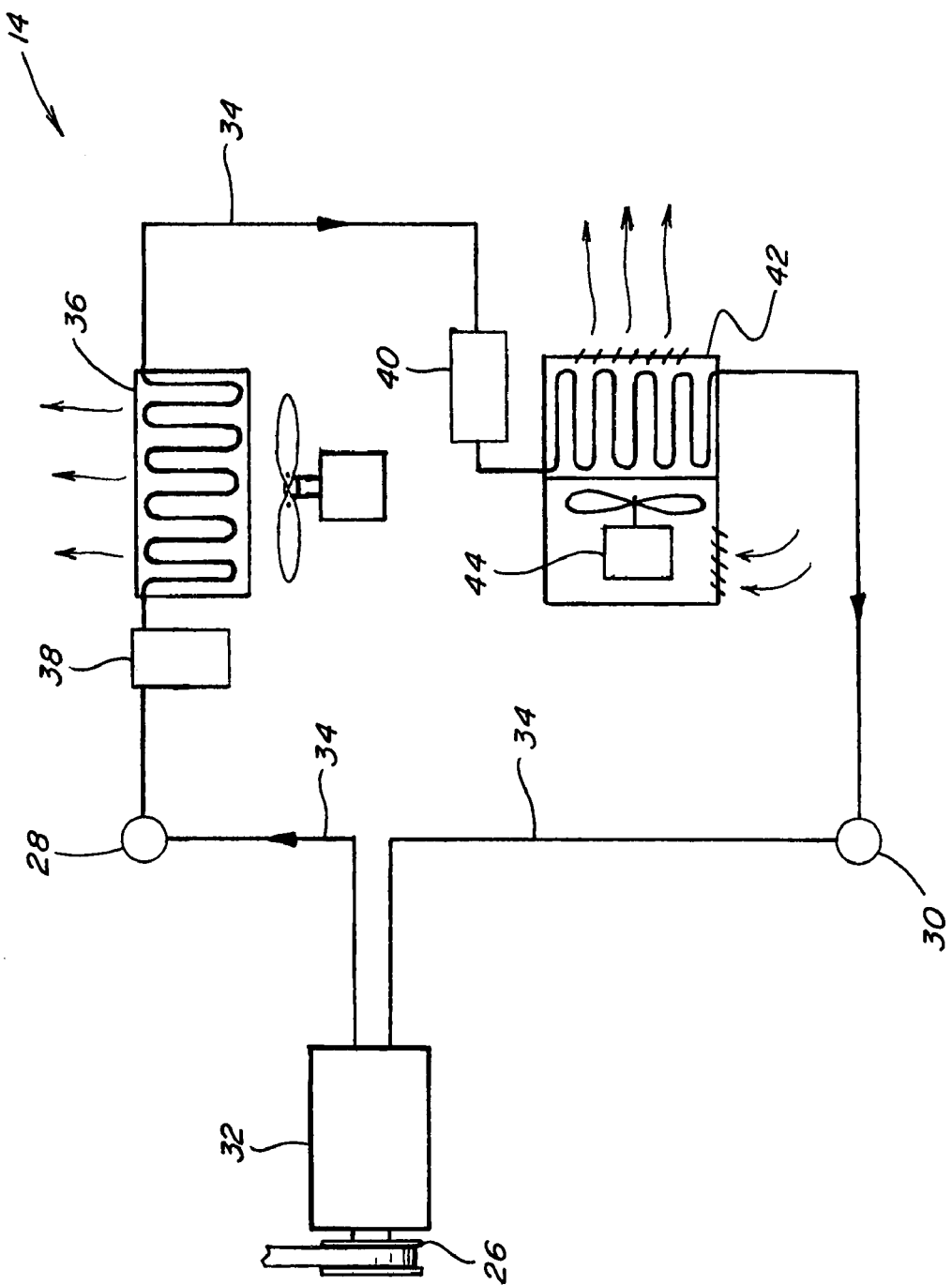
FIG. 2 is a simplified schematic representation of an air conditioning system of the tractor loader backhoe of FIG. 1.

Referring also to FIG. 2, air conditioning system 14 is controllable by an operator using suitable input devices, which can include, but are not limited to, a blower switch 22, also including an on/off switch for system 14, and a temperature controller or thermostat 24, which can be, for instance, a conventional rotary or linear potentiometer, or the like, both located in cab 16 (FIG. 1). Air conditioning system 14 includes a compressor clutch 26, a high pressure switch 28, and a low pressure switch 30. Compressor clutch 26 is controllably engageable to connect a refrigerant compressor 32 of air conditioning system 14 with a drive, such as an auxiliary belt drive driven by engine 12, for compressing refrigerant of the air conditioning system in the well known manner. The refrigerant will be compressed to a designated high pressure and will flow, as denoted by the arrows (FIG. 2), along a fluid path through refrigerant lines 34 which connect to a heat exchanger or condenser 36 of a high pressure side of system 14. Condenser 36 will typically be located in a rack with other heat exchangers, such as the engine radiator, located in this application near the front end of engine 12 (FIG. 1). Compressor 32 may be located near this end of the engine also. High pressure switch 28 is located in a high-pressure side refrigerant line 34 and is operable for detecting over pressure conditions in the high pressure side of the system.

From condenser 36, the pressurized refrigerant will flow through lines 34 of the high pressure side to a receiver dryer 38, and from there, through an expansion valve 40. The refrigerant will exit expansion valve 40 at a lower pressure, and flow at the lower pressure through a low pressure side of the system to a second heat exchanger or evaporator 42, through which cab air is directed by a blower fan 44 for cooling the interior space of the cab in the well known manner.

From evaporator 42, the lower pressure refrigerant will pass through the low pressure side en route to compressor 32, completing a closed loop. Low pressure switch 30 is located in a low pressure side refrigerant line 34, typically at the outlet of evaporator 42, and is operable for detecting undesirable and possibly damaging low pressure conditions in the low pressure side of the system, for instance, but not limited to, pressure conditions lower than about 4 pounds per square inch (psi). This ensures that compressor 32 will not operate with a vacuum inlet condition, which could cause premature failure of the compressor, as well as provide an opportunity to draw outside contamination into the system.

Figure 3:
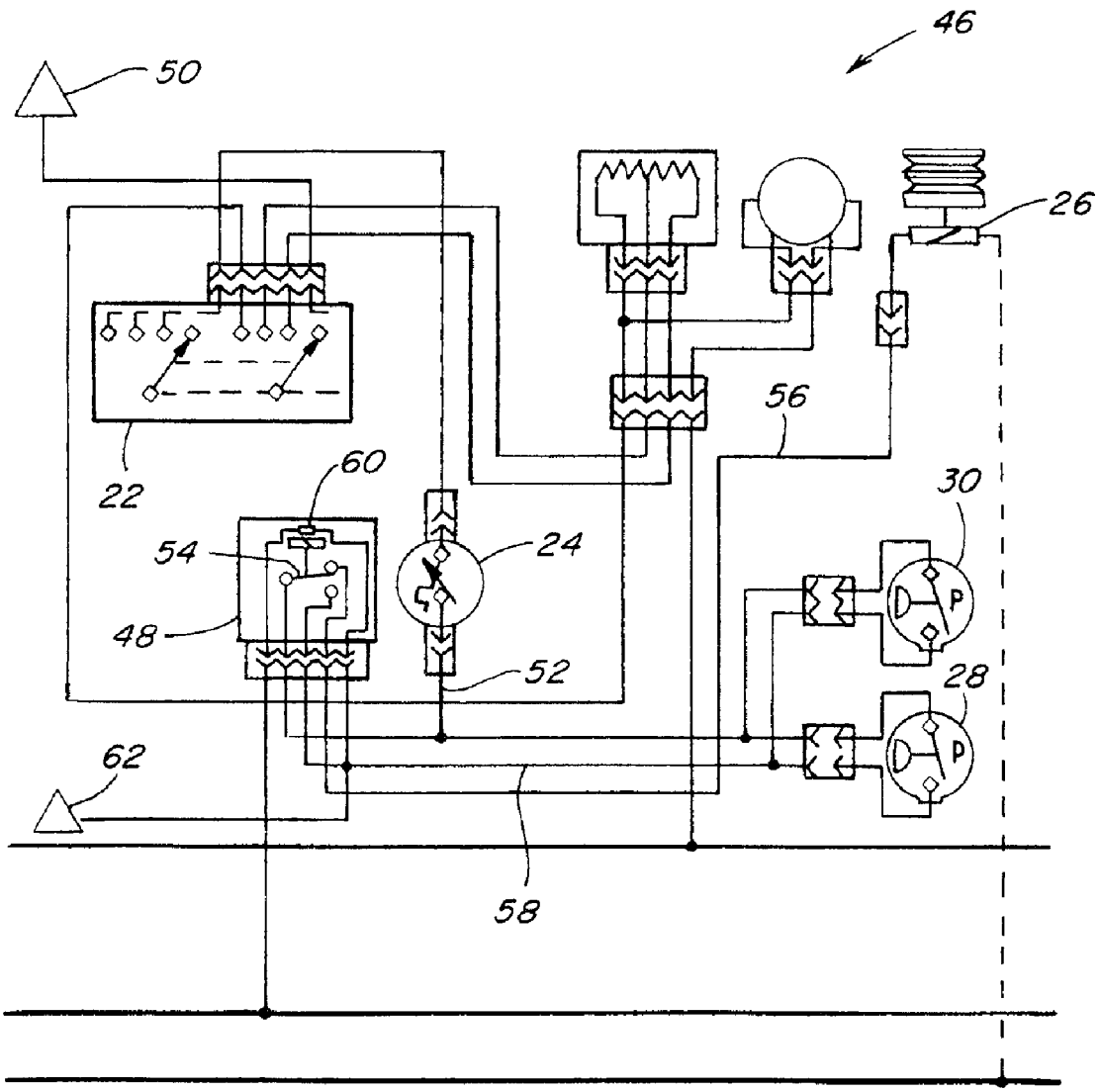
FIG. 3 is a simplified schematic representation of a prior art cut-out circuit for an air conditioning system.

Referring also to FIG. 3, a known prior art high and low pressure cut-out circuit 46 for an air conditioning system, such as system 14, used on tractor loader backhoes, is shown. Cut-out circuit 46 energizes a normally closed relay 48 which receives a voltage from a voltage source 50 via switch 22 and thermostat 24, when in operative positions, respectively, over a conductive path 52. An armature 54 of relay 48 outputs the voltage over a conductive path 56 to compressor clutch 26. Voltage supplied to relay 48 from voltage source 50 is also supplied in parallel to both the high and low pressure switches 28 and 30. The high and low pressure switches 28 and 30 are set to be normally open during normal operating conditions. This maintains pressures less than a predetermined maximum pressure, here, preferably about 400 psi, on the high side of the fluid circuit, and pressures greater than a predetermined minimum pressure, here, preferably about 4 psi, on the low side.

When an abnormal operating condition occurs, (pressure drops above or below the switches' operating threshold) either switch 28 or 30 will actuate and send a voltage over a conductive path 58 to an electromagnet 60 of relay 48, to cause armature 54 to move (down in FIG. 3) to open relay 48 and thus the circuit providing the voltage over conductive path 56 to clutch 26, that is, so as to create an interruption of the voltage flow to clutch 26. When this occurs, relay 48 is preferably configured such that armature 54 is latched in the lower position, and the compressor will thus remain off, until the system is manually cycled off and back on. This is achieved by cycling switch 22 off and on again. Also, a voltage is sent via conductive path 58 to a signal light 62 in cab 16, to indicate a problem.

As explained above under the Background Art heading, cab 16 of a tractor loader backhoe sustains a quite high cab heat load, due to the large area of windows 18 surrounding the cab, and the high heat dissipation of the hydraulics and power train of the machine. As a result, it has been found that, when outside ambient temperatures are below about 50° F., and the sun is bright, the air conditioning may be switched on. The thermodynamics of an air conditioning system, such as system 14 illustrated, is that the cool ambient temperatures will often create a greater pressure drop than under other operating conditions, such that low pressure switch 30 will operate more frequently to cut-out the system. In addition to these cool weather conditions, internal cab temperature fluctuations caused by frequent opening and closing windows/doors, and turning the heat or air conditioning on and off, can also create low side pressure drops in the system to actuate low pressure switch 30. With the circuit of FIG. 3, each time high or low pressure switch 28 or 30 cuts the system out, it must be reset by turning the system off and on again using switch 22. And, in the event that it is desired to identify and correct a problem with the system, since the cut-out routine is the same for both the high and low sides of the system, diagnosis of the problem will be more difficult.

Figure 4:
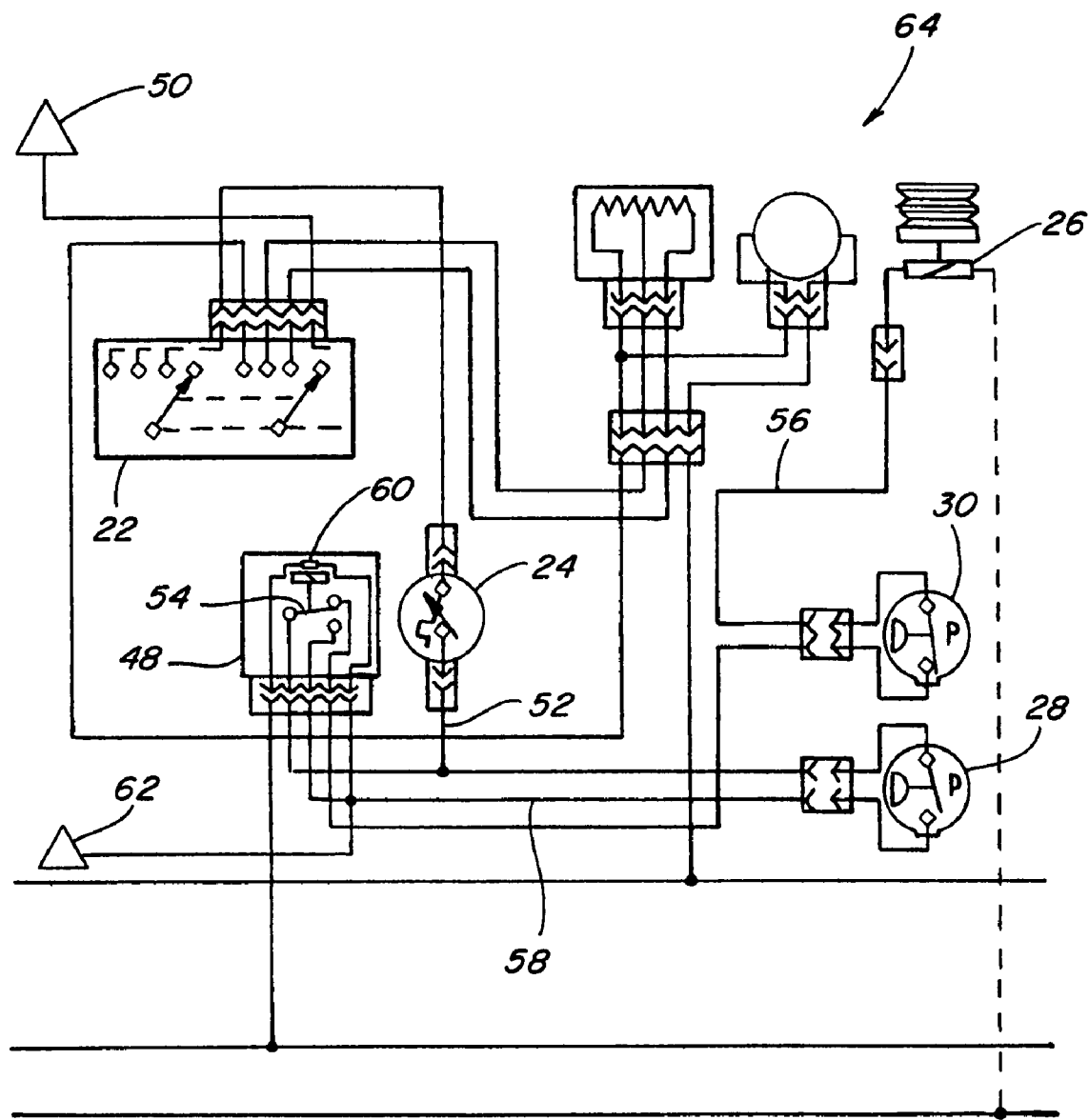
FIG. 4 is a simplified schematic representation of a cut-out circuit for the air conditioning system of FIG. 2, according to the invention.

Referring also to FIG. 4, an improved cut-out circuit 64 constructed and operable according to the present invention is illustrated, which overcomes one or more problems and shortcomings of prior art circuit 46 shown in FIG. 3. In cut-out circuit 64, normally closed relay 48 still receives a voltage from a voltage source 50 via switch 22 and thermostat 24, when in operative positions, respectively, over a conductive path 52. Voltage supplied to relay 48 from voltage source 50 is also supplied to high pressure switch 28. However, circuit 64 is different from circuit 48 in that low pressure switch 30 is located in conductive path 56, between relay 48 and compressor clutch 26, instead of in connection with electromagnet 60 as in circuit 46. This leaves only high pressure switch 28 in operative control of electromagnet 60. High pressure switch 28 is set again to be normally open during normal operating conditions, but as another difference, low pressure switch 30 is set to be normally closed. As a result, low pressure switch 30 directly controls the operation of compressor clutch 26, and not the latch out of relay 48. In operation, anytime a low side pressure drop below a predetermined minimum pressure, again preferably about 4 psi, is present, low pressure switch 30 will responsively open the circuit to clutch 26, de-activating the compressor. Then, when the pressure in the low side rises again above the predetermined minimum pressure, the circuit to clutch 26 will be responsively closed and compressor 32 will be automatically reactivated. When the pressure in the high side rises above a predetermined maximum pressure, again, preferably about 400 psi, relay 48 will be latched open, as before. Also, when the circuit is opened by switch 30, light 62 is not activated. Thus, as another advantage of the circuit of the present invention, if light 62 is illuminated, it can only be due to a high pressure problem (i.e., dirty condenser or system restriction). Then if there is ever inadequate cooling, or the compressor is not coming on, it points directly towards a low pressure problem or lack of refrigerant.

Circuit 64 of the invention thus allows adequate air conditioning functioning during cool ambient temperatures, and the system will still be capable of protecting the compressor from low pressure occurrences, and will still latch out the compressor during high pressure to prevent rapid cycling and failure.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An air conditioning system, comprising:
   a closed refrigerant fluid path including a low pressure side and a high pressure side;
   a compressor disposed in the fluid path between the low pressure side and the high pressure side;
   a clutch disposed between the compressor and a drive, the clutch being engageable by application of an electrical voltage thereto for connecting the drive in driving relation to the compressor; and
   a cut-out circuit including a device electrically connected to a voltage source for receiving a voltage therefrom, the device being connected to the clutch through a conductive path and a low pressure switch located within the path, the device being configured and operable for outputting a voltage to the low pressure switch for engaging the clutch for driving the compressor, the low pressure switch being connected to the low pressure side of the fluid path so as to be exposed to a pressure therein and being automatically operable for interrupting the voltage flow to the clutch when the pressure is less than a predetermined minimum pressure, and for reinstating the voltage flow when the pressure returns to at least the minimum pressure, and the cut-out circuit including a high pressure switch connected to the high pressure side of the fluid path so as to be exposed to a pressure therein, the high pressure switch being connected between a voltage source and to the device and operable in cooperation with the device to interrupt a voltage flow to the low pressure switch when the pressure in the high pressure side of the fluid path is above a predetermined maximum value and to continue to interrupt the voltage flow until a voltage received by the device is interrupted and resumed.

2. The system of claim 1, wherein the device comprises a relay.

3. The system of claim 1, further comprising a light in connection with the high pressure switch so as to be illuminated when the pressure in the high pressure side of the fluid path is above the predetermined maximum value.

* * * * *